United States Patent [19]

Dessauer et al.

[11] 4,132,826

[45] Jan. 2, 1979

[54] DISPOSABLE BLANKET FOR AN OFFSET PRINTING MACHINE

[75] Inventors: Guido Dessauer, Dusseldorf-Gerresheim; Egon Leisner, Dusseldorf; Alfred Rohr, Bad Salzuflen, all of Germany

[73] Assignee: Feldmühle Aktiengesellschaft, Dusseldorf-Oberkassel, Germany

[21] Appl. No.: 833,305

[22] Filed: Sep. 14, 1977

Related U.S. Application Data

[63] Continuation of Ser. No. 682,571, May 3, 1976, abandoned, which is a continuation-in-part of Ser. No. 450,079, Mar. 11, 1974.

[30] Foreign Application Priority Data

Mar. 14, 1973 [DE] Fed. Rep. of Germany ....... 2312596

[51] Int. Cl.[2] .......................... B32B 3/26; B41M 5/00

[52] U.S. Cl. ................................ 428/314; 101/401.1; 101/462; 101/465; 428/332; 428/339; 428/909

[58] Field of Search ..................... 101/401.1, 395, 462, 101/465, 466; 428/314, 332, 334, 512, 538, 908, 909

[56] References Cited

U.S. PATENT DOCUMENTS

| | | | |
|---|---|---|---|
| Re. 28,070 | 7/1974 | Brindell et al. | 428/922 |
| 3,215,647 | 11/1965 | Dunn | 260/2.5 L |
| 3,235,772 | 2/1966 | Gurin | 428/909 |
| 3,491,033 | 1/1970 | Dunn | 260/2.5 L |
| 3,764,376 | 10/1973 | Wagner et al. | 428/922 |
| 3,773,551 | 11/1973 | Kiener et al. | 428/452 |
| 3,802,952 | 4/1974 | Gurin et al. | 428/424 |
| 3,903,794 | 9/1975 | Grupe et al. | 428/909 |

*Primary Examiner*—William R. Dixon, Jr.
*Attorney, Agent, or Firm*—Hans Berman

[57] ABSTRACT

A disposable sheet to replace the rubber blanket of an offset printing machine basically consists of a flexible carrier sheet and a coating on one face of the sheet consisting essentially of a cellular latex of a synthetic elastomer free from inorganic fillers in more than incidental trace amounts and deriving its capability of receiving an inked image from partial cross linking.

10 Claims, No Drawings

DISPOSABLE BLANKET FOR AN OFFSET PRINTING MACHINE

This application is a continuation of copending application Ser. No. 682,571, filed May 3, 1976, and now abandoned, which itself is a continuation-in-part of abandoned application Ser. No. 450,079, filed Mar. 11, 1974.

This invention relates to offset printing, and particularly to a disposable blanket to replace the permanent rubber blanket which conventionally transfers an inked image from a dampened and inked plate to a sheet material, such as paper, when the sheet material passes between a blanket cylinder carrying the rubber blanket and in impression cylinder.

After each press run, the blanket cylinder of a conventional offset printing machine must be cleaned of previously applied ink. The operation is time-consuming and requires some skill. This is acceptable between long, commercial printing runs, but a serious shortcoming in a table-top offset machine of the type commonly used in offices and operated by clerical personnel. Small office-type offset printing machines have been equipped, therefore, with automatic blanket cleaning devices which do not rely on the skill of an operator, but are relatively complex and correspondingly costly.

It has therefore been proposed to cover the blanket cylinder of an offset printing machine with a blanket inexpensive enough to be disposable after each press run so as to avoid a blanket washing operation. The disposable blankets available heretofore do not adequately combine the required properties which include:

(1) Adequate wetting by the damping fluid and the ink employed.

(2) Ready acceptance of the inked image from the inked and dampened plate, and ready release of the inked image to a paper sheet.

(3) Adequate resiliency in the direction of its thickness for full and uniform area contact of the blanket with the plate and with the printed substrate, such as a paper sheet.

(4) Adequate tear and tear-propagation resistance so as to permit up to at least 20,000 impressions to be made by each blanket.

(5) Ready dissipation of electrostatic charges which would cause blurring of the printed image and may interfere with quick release of the used blanket from the machine after the completion of a printing run.

(6) Adequate stiffness to facilitate separation of the blanket from the blanket cylinder after a run.

(7) Low cost.

It was proposed heretofore to employ foils of polystyrene foam as disposable blankets, but this material is not adequately wetted by the ink and the damping fluid, is so limp as to cling to the blanket cylinder, and accumulates an excessive electrostatic charge even in a short printing run. Attempts at coating paper with polystyrene foam or other foamed plastic did not produce a useful product.

It has been proposed in U.S. Pat. No. 3,773,551 to coat a paper sheet with a material closely similar to the material of a conventional rubber blanket, that is, a rubber composition containing enough carbon black and other inorganic fillers to impart to the rubber composition the required receptivity for offset printing ink and damping liquid. The fillers, however, reduce the resiliency of the blanket and restrict its use to printing paper which is very smooth.

A primary object of this invention is the provision of a disposable blanket for an offset printing machine which meets all the seven requirements enumerated above, and is sufficiently resilient to produce sharp and uniform impressions on inexpensive and relatively rough paper as a printing substrate.

With this object and others in view, the invention provides a disposable blanket for an offset printing machine which has a flexible carrier sheet, normally paper, and a coating on one face of the carrier sheet which is capable of receiving an inked image and essentially conists of a latex of partly cross-linked synthetic elastomer. The cross linking is readily controlled to impart the desired acceptance and release of an inked image even if the coating is free from inorganic fillers in more than incidental trace amounts, and thus maintains adequate resiliency. Such resiliency is enhanced when the coating is cellular and gas pockets are distributed in the latex.

The coating thickness may be chosen relatively freely between 30 and 300 microns, but best results are usually achieved at thicknesses between 120 and 170 microns.

The polymer which is the basic ingredient of the latex may contain available carboxyl groups in its molecule to make it more hydrophilic. The affinity of the coating to the ink is correspondingly reduced, and the carboxyl content of the polymer must be restricted accordingly, or it must be compensated for by mixing the coating material with an oleophilic addition agent, such as a stearate, a wax, or a dispersion of an oleophilic synthetic resin such as a polymer of an acrylate, vinyl acetate, and the like.

The properties of the coating are affected greatly by the bulk density of the foam employed as a partly liquid coating material. The foam, as applied to the carrier material, should have a bulk density of 250 to 800 g/liter, the optimum value being determined by a few test runs under specific conditions and with specific materials. Best results are generally achieved by coating the carrier sheet with a latex foam having a bulk density of approximately 400 g/liter. The bulk density of the dry coating should be between 0.2 and 0.4 g/cm$^3$, preferred practice calling for a density of about 0.25 g/cm$^3$. The air or other gas used for foaming should be distributed uniformly in the coating in a multiplicity of cells or pockets of the smallest possible size to maintain the structural strength of the foam without impairing its resiliency. Surface porosity of the coating is neither necessary nor relevant.

A primer coating may be interposed between the carrier and the latex coating which provides the exposed surface on one face of the carrier sheet. A primer may improve the surface smoothness of the finished coated blanket, particularly when the latex is cured at elevated temperature. However, a primar is not always necessary, and the absence of the primer may facilitate coagulation of the latex by absorption of its water content into the paper carrier.

Suitable primers may be solutions or emulsions in volatile liquid media of mixtures of styrene-butadiene copolymer with casein or polyvinyl alcohol or starch, and may additionally contain pigments.

It is preferred to prevent warping or buckling of the carrier by applying a coating to the back face not covered by the latex coating. When the back-face coating contains an electrolyte such as lithium chloride or an electrically conductive polymer, it assists in dissipating static electric charges.

The cross-linking of the elastomer in the latex coating may be achieved by mixing the other ingredients of the coating composition with precondensates of urea, melamine, or phenol with formaldehyde, preferably in the A stage, and curing the thermosetting resin while it is intimately mixed with the elastomer. However, the cross-linking bonds may be formed in the elastomer itself by means of suitable vulcanizing agents, known in themselves, and suitable accelerators such as ammonium chloride, ammonium acetate, and the like, as is well known.

Preferred vulcanizing agents include sulfur, particularly colloidal sulfur, and compounds of sulfur in which the sulfur is the active component, and zinc oxide. The latex may further contain stabilizers, emulsifiers, and the like. The viscosity of the latex coating composition may be adjusted by means of thickeners prior to application to the carrier sheet, and other modifications will readily suggest themselves to those skilled in the art.

The following Examples are further illustrative of this invention. All parts and percentage values are by weight unless stated otherwise.

EXAMPLE 1

A web of paper free from wood particles, sized with resin composition, and weighing 100 $g/m^2$ was coated in continuous operation on one side with an aqueous dispersion of 66% China clay, 33% polyvinylalcohol of medium viscosity, and 1% green pigment as a tracer. It was then oven-dried.

The other side or face of the paper web was coated with a foamed latex composition according to the invention, and the coated traveling web then was passed through a tunnel oven in which the temperature was gradually increased to dry and cure the coating. The web discharged from the oven was cut into sheets ready to be affixed to the blanket roller of an offset printing machine in the same manner in which plates of paper and the like are attached to plate cylinders.

The latex composition referred to above was prepared by intimately mixing 20 parts of a commercial styrene-butadiene copolymer latex, 0.1 part tylose as a thickener, 2 parts of a commercial vulcanizing agent essentially consisting of zinc oxide and sulfur, 0.1 part potassium oleate as an emulsifier, and 25 parts water. This stock mixture was foamed with nitrogen in a conventional foaming vessel and mixed with 6 parts aqueous 10% ammonium acetate solution per 100 parts stock mixture immediately prior to use in the coating apparatus, the ammonium acetate serving as a gelling agent.

The foamed paste applied to the paper web had a bulk density of 400 g/liter. It was further expanded to 0.25 $g/cm^3$ by the heat treatment in which the elastomer was partly vulcanized or cross-linked.

EXAMPLE 2

A paper web was provided with a backing coating as described in Example 1, and its front face was then coated with a foamed mixture of 830 g of a latex of styrene-butadiene copolymer including repeating units of an acid which provided available carboxyl groups, 222 parts of a 50% aqueous solution of A-stage melamine-formaldehyde resin, 30 parts 10% alginate solution as a thickener, 50 parts p-toluenesulfonic acid as a catalyst for curing the melamine-formaldehyde resin, and 10 parts aqueous 30% paraffin dispersion, the amount of paraffin dispersion having been determined experimentally as being sufficient to counter-act the hydrophilic properties of the material due to the carboxyl groups in the copolymer.

The coated web was dried and cured in the tunnel oven described in Example 1, and discharged from the hot end of the oven in which the temperature was 160° C. It was further processed as described in Example 1. Prints of good quality were produced with the disposable blankets prepared in Examples 1 and 2.

EXAMPLE 3

Unsized paper weighing 95 $g/m^2$ was made on a Fourdrinier type paper machine from stuff free from wood fibers and containing sulfate process cellulose derived 60% from conifer wood and 40% from deciduous wood together with a commercial composition enhancing the wet strength of the paper. The back face of the paper was coated on the size press of the machine with polyvinyl alcohol in an amount of 2–3 $g/m^2$.

Sheets of the paper were coated on the front faces thereof with five latex compositions foamed to a uniform density of 500 g per liter in an approximate amount of 60 $g/m^2$ on a dry basis. Each composition was prepared from aqueous dispersions or solutions of the following ingredients:

| | |
|---|---|
| Carboxylated styrene-butadiene rubber latex (1),50% | 830 g |
| A-Stage melamine-formaldehyde resin (2), 89.3% | Variable |
| Zinc oxide, 50% | 50 g |
| Carboxymethylcellulose (3), 3% | 30 g |
| Di-sodium N-octadecylsulfosuccinamate (4), 36% | 75 g |
| Toluene-p-sulfonic acid, 15% | 76 g |
| Calcium stearate (5), 50% | 222 g |

(1) BL 1070, Chemische Werke Huls
(2) Cymel, American Cyanamid
(3) Tylose 7HCF, Farbwerke Hoechst
(4) Aerosol 18, American Cyanamid
(5) Nopcote C 104, Nopco The respective amounts of melamine-formaldehyde resin solution in coating compositions A to E, the pH values of the compositions as supplied to the knife of the laboratory coating machine employed, the weight and thickness of the coated, dry paper are listed in the Table below together with the quality of the prints produced when the coated paper was used instead of a rubber blanket with the same plastic plate on the same, small office offset duplicator at identical settings for all variables for printing on sheets of the same batch of paper (80 $g/cm^2$, white, free from the wood fiber, sized and starch coated on the sizing press).

Table

| Composition | A | B | C | D | E |
|---|---|---|---|---|---|
| Resin solution, g | 0 | 25 | 50 | 100 | 200 |
| pH | 6.7 | 7.0 | 6.7 | 6.8 | 6.6 |
| Weight, $g/m^2$ | 138 | 158 | 156 | 157 | 153 |
| Thickness, $\mu$ | 180–190 | 220–225 | 195–205 | | 225–205 |
| Print quality | 6 | 2 | 4 | 5 | 5 |

Print quality was established by an experienced printer on the basis of an empirical, but reproducible scale ranging from an optimum value of 1 (sharply defined contours) to a lowest grade of 6 (barely legible or worse).

The observed variations in pH, weight, and thickness were too small to affect the results of the printing tests which indicate that results with 25 g melamine resin solution were distinctly superior to larger amounts of the cross-linking resin or no resin at all.

Analogous results were achieved when the melamine-formaldehyde precondensate was replaced by approximately equal dry weights of precondensates of formaldehyde with phenol or urea, but the optimum amount of cross-linking agent depends on virtually all other process variables and must be determined experimentally for each set of conditions, the preceding Examples providing useful starting points for such experimentation.

The nature of the elastomer in the latex is not in itself critical to the success of the invention, but it greatly affects the amounts of cross-linking agent necessary for achieving the desired balance of hydrophilic and oleophilic properties.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A disposable offset printing blanket consisting essentially of:

(a) a flexible carrier sheet; and (b) a coating on one face of said sheet having a thickness of 30 to 300 microns, (1) said coating consisting essentially of a cellular, cross-linked, synthetic elastomer, the coating having a dry bulk density of 0.2 to 0.4 g/cm$^3$, (2) the amount of cross-linking of said elastomer being effective for establishing the balance of hydrophilic and oleophilic properties of said elastomer necessary for receiving an inked image from a damped offset plate and for transmitting said image to a sheet of paper by contact with said plate and with said sheet of paper respectively.

2. A blanket as set forth in claim 1, wherein said carrier sheet consists essentially of paper.

3. A blanket as set forth in claim 2, further comprising another coating on the other face of said sheet, said other coating being electrically more conductive than the coating on said one face.

4. A blanket as set forth in claim 2, wherein said elastomer is a styrene-butadiene copolymer cross-linked with melamine-formaldehyde resin.

5. A blanket as set forth in claim 1, wherein said elastomer is a styrene-butadiene copolymer.

6. A blanket as set forth in claim 5, wherein said elastomer contains available carboxyl groups effective for enhancing the hydrophilic properties of said coating, and an oleophilic ingredient in an amount effective for balancing a portion of the hydrophilic effect of said carboxyl groups.

7. A blanket as set forth in claim 6, wherein said oleophilic ingredient is selected from the group consisting of a stearate, a wax, and an oleophilic synthetic resin.

8. A blanket as set forth in claim 7, wherein said oleophilic ingredient is polyacrylate, polyvinyl acetate, or paraffin.

9. A blanket as set forth in claim 1, wherein said thickness is 120 to 170 microns, and said cellular elastomer has a bulk density of about 0.25 g/cm$^3$.

10. A blanket as set forth in claim 1, wherein said elastomer is cross-linked by a formaldehyde condensation product of melamine, urea or phenol.

* * * * *